United States Patent
Stenzel et al.

(10) Patent No.: US 8,544,658 B2
(45) Date of Patent: Oct. 1, 2013

(54) FUNCTIONALIZED THIN FILM POLYAMIDE MEMBRANES

(75) Inventors: Marina H. Stenzel, Sydney (AU);
Ricardo Godoy-Lopez, Terneuzen (NL);
Simon Harrisson, Bourg-la-Reine (FR);
Ezio Rizzardo, Wheelers Hill (AU)

(73) Assignee: Polymers CRC Limited, Notting Hill, Victoria (AU)

( * ) Notice: Subject to any disclaimer, the term of this patent is extended or adjusted under 35 U.S.C. 154(b) by 239 days.

(21) Appl. No.: 13/056,687

(22) PCT Filed: Aug. 3, 2009

(86) PCT No.: PCT/EP2009/060029
§ 371 (c)(1),
(2), (4) Date: Apr. 26, 2011

(87) PCT Pub. No.: WO2010/015599
PCT Pub. Date: Feb. 11, 2010

(65) Prior Publication Data
US 2011/0189469 A1   Aug. 4, 2011

(30) Foreign Application Priority Data
Aug. 5, 2008   (EP) .................................. 08161828

(51) Int. Cl.
*B01D 39/00* (2006.01)
*B01D 39/14* (2006.01)

(52) U.S. Cl.
USPC ............ 210/500.38; 210/500.21; 210/500.35; 210/490; 210/500.27; 210/500.1; 264/48; 264/41; 427/244; 427/245; 427/246

(58) Field of Classification Search
None
See application file for complete search history.

(56) References Cited

U.S. PATENT DOCUMENTS

| 4,277,344 A | 7/1981 | Cadotte |
| 4,581,429 A * | 4/1986 | Solomon et al. ............. 526/220 |
| 5,945,491 A | 8/1999 | Matyjaszewski et al. |
| 2007/0251883 A1 | 11/2007 | Niu |
| 2008/0203013 A1 | 8/2008 | Zhao et al. |

FOREIGN PATENT DOCUMENTS

| EP | 1894614 A | 3/2008 |
| JP | 2007-014833 A | 1/2007 |
| WO | 86/05499 A | 9/1986 |
| WO | 2006/046781 A1 | 5/2006 |

OTHER PUBLICATIONS

Xu, et al., Langmuir vol. 23, No. 16, 2007 pp. 8585-8592.
PAJ 2007-014833 Jan. 25, 2007.

* cited by examiner

*Primary Examiner* — Ana Fortuna
*Assistant Examiner* — Benjamin J Behrendt
(74) *Attorney, Agent, or Firm* — Tyler A. Stevenson

(57) ABSTRACT

The present invention relates to a method of preparing RAFT, ATRP or NMRP functionalized thin film composite (TFC) polyamide membranes on a microporous substrate. A further aspect of the invention is the subsequent modification of the thin film composite polyamide membrane by controlled free radical polymerization (CFRP) to yield membranes having new chemical and physical properties, e.g. antifouling and/or antibacterial properties. Further aspects of the invention are the functionalized thin film composite (TFC) polyamide membranes on the microporous substrate itself and the membranes modified by controlled free radical polymerization.

17 Claims, No Drawings

FUNCTIONALIZED THIN FILM POLYAMIDE MEMBRANES

The present invention relates to a method of preparing RAFT, ATRP or NMRP functionalized thin film composite (TFC) polyamide membranes on a microporous substrate. A further aspect of the invention is the subsequent modification of the thin film composite polyamide membrane by controlled free radical polymerization (CFRP) to yield membranes having new chemical and physical properties, e.g. antifouling and/or antibacterial properties. Further aspects of the invention are the functionalized thin film composite (TFC) polyamide membranes on the microporous substrate itself and the membranes modified by controlled free radical polymerization.

Under the term RAFT there is understood reversible addition fragmentation chain transfer polymerization (RAFT), which is a well known controlled free radical polymerization technique and for example described in WO 98/01478, WO98/58974, WO 99/31144, WO 99/05099, WO 02/094887, WO 02/26836, WO 01/42312, WO 00/75207, and WO 99/35177.

Under the term ATRP there is understood atom transfer radical polymerization (ATRP). This type of controlled free radical polymerization is, for example, described in WO 96/30421.

Under the term NMRP there is understood nitroxyl mediated radical polymerization, a free radical polymerization process by controlled or "living" growth of polymer chains, which produces defined oligomeric homopolymers and copolymers, including block and graft copolymers. In U.S. Pat. No. 4,581,429 disclosed is the use of initiators of the partial formula R'R"N—O—X. In the polymerization process the free radical species R'R"N—O● and ●X are generated. ●X is a free radical group, e.g. a tert.-butyl or cyanoisopropyl radical, capable of polymerizing monomer units containing ethylene groups.

A variation of the above process is disclosed in U.S. Pat. No. 5,322,912 wherein the combined use of a free radical initiator and a stable free radical agent of the basic structure R'R"N—O● for the synthesis of homopolymers and block copolymers is described.

Interfacial polymerization is copolymerization of two reactive monomers dissolved in two immiscible solutions respectively. The monomers can meet and react only at the interface of the solutions when two solutions are contained in a reaction chamber. As the reaction continues, polymer film is formed at the interface. The film is usually very thin because the growing interfacial polymer behaves as a barrier to diffusion of the two monomers, and the polymerization levels off at a limiting thickness, typically of the order of a micrometer or less. To provide durability to the fragile films, the interfacial polymerization was frequently carried out at the surface of a microporous substrate, in which case the result is called a thin-film composite membrane. This is for example described by Wamser et al., J. Am. Chem. Soc. 111, 1989, 8485-8491.

The current worldwide expansion and diverse application of Reverse Osmosis (RO) technology has resulted from the introduction of thin-film-composite (TFC) membranes by interfacial polymerization. Most commercial TFC membranes are aromatic polyamides or their derivatives. It is well known that aromatic polyamide composite membranes have excellent salt rejection and water flux, and they are applicable in a wide range of water purification applications.

However, fouling is currently one of the major remaining problems for aromatic polyamide RO membranes. Fouling causes deterioration of the membrane performance and shortens membrane life, limiting further application of RO membrane technology. It is thus desirable to improve the surface properties of RO membranes without impairing their transport characteristics in order to enhance their resistance to fouling. There is obviously a need for a process which allows the surface modification of TFC polyamide membranes to overcome these problems.

Surprisingly it has been found that RAFT/ATRP/NMRP functionalized TFC polyamide membranes can be prepared by interfacial reaction of an aromatic polyamide and a mixture of an aromatic acyl halide and a RAFT-functional or ATRP-functional acid halide or epoxy functional alkoxyamine (NMRP) on a microporous substrate. These RAFT/ATRP/NMRP functionalized TFC polyamide membranes can be used for the controlled radical polymerization of ethylenically unsaturated monomers or oligomers for improving or modifying chemical and physical properties on the surface of the membrane, which may be suitable, for example, to prepare membranes having new antifouling and/or antibacterial properties.

The present invention provides a method for preparing RAFT, ATRP or NMRP functionalized TFC polyamide membranes by condensation polymerization on a microporous substrate.

As mentioned above it is mandatory that the subsequent modification step is carried out by controlled free radical polymerization (CFRP) where the functionalized sites serve as starting points for the chain growth.

One aspect of the invention is a method for the preparation of a functionalized thin film composite polyamide membrane on a microporous substrate comprising carrying out on the porous substrate a polycondensation reaction of a) an aromatic amine with at least two amine functionalities; with an aromatic acyl halide with at least 3 —C(O)Cl groups; in the presence of b1) a radical addition fragmentation chain transfer (RAFT) control agent or b2) an atom transfer radical polymerization (ATRP) control agent or b3) a nitroxide-mediated radical polymerization (NMRP) control agent having a glycidyl functionality.

Preferred is a method for the preparation of a functionalized thin film composite membrane as defined above consisting of a continuous polyamide layer on a microporous substrate comprising carrying out on the porous substrate a polycondensation reaction of a) an aromatic amine with at least two amine functionalities; with an aromatic acyl halide with at least 3 —C(O)Cl groups; and b1) a radical addition fragmentation chain transfer (RAFT) control agent having an acid halide functionality, b2) an atom transfer radical polymerization (ATRP) control agent having an acid halide functionality, or b3) a nitroxide-mediated radical polymerization (NMRP) control agent having a glycidyl functionality.

Preferably the aromatic amine compound is of low molecular weight and soluble in water. The amine functional group is preferably primary rather than secondary and less (in number) than the functionality of the acyl halide compound. Preferably the aromatic acyl halide compound has at least three or more acyl chloride functionalities and should be soluble in a non-polar solvent.

A non-polar solvent is a solvent that is considerably less polar than the typical polar solvents, such as water, $C_1$-$C_3$ alkanols, ammonia and the like and for instance less than 5 weight-percent soluble in water at 20° C. Typical examples are $C_1$-$C_{12}$ aliphatic hydrocarbons such as pentane, hexanes, heptanes, octanes; cycloalkanes, for example cyclohexane.

The term "polymer" as used herein includes oligomers and polymers with (units)$_n$. The upper limit of an "n" will be defined by the particular characteristics of the polymer chain.

The porous substrate comprises polymeric material containing pore sizes which are sufficient to permit the passage of permeate but are not large enough so as to interfere with the bridging over of the resulting RAFT/ATRP/NMRP functionalized TFC polyamide film. Typically the pore size range may be 0.01-5 micrometers, preferably 0.1-1 micrometer, measured by SEM.

The porous substrate may be inorganic or organic. As inorganic materials there come into consideration porous silica in the form of thin films or, for example, zeolite.

As already mentioned above reversible addition fragmentation chain transfer polymerization (RAFT) is a well known controlled free radical polymerization technique. In the RAFT-polymerization process, specific thiocompounds (RAFT control agents) are used in conjunction with classical free radical initiators (like peroxides or azo-initiators) to result in a polymer with living characteristics, i.e a polymer with low polydispersity. Due to the living characteristics, the RAFT polymerization process also allows to synthesize defined block copolymer structures. Thus the method described above under b1) allows modifying the TFC membrane in a later stage, starting from the sites of the RAFT control agent.

Different classes of RAFT agents are known to those skilled in the art, examples are di-thio-esters, thioxanthogenates or dithiocarbamates For instance the reversible addition fragmentation chain transfer agent is a di-thioester, for example di-thiobenzylbenzoate, such as described in WO98/01478.

The polymer or copolymer can also be prepared in a controlled way by atom transfer radical polymerization (ATRP). This type of polymerization is, for example, described in WO 96/30421. WO 96/30421 discloses a controlled or "living" polymerization process of ethylenically unsaturated monomers such as styrene or (meth)acrylates by employing the ATRP method. According to this method initiators are employed which generate a radical atom such as ●Cl, in the presence of a redox system of transition metals of different oxidation states, e.g. Cu(I) and Cu(II), providing "living" or controlled radical polymerization.

A suitable initiating compound is of formula (XI),

(XI)

with a radically transferable atom or group ●Hal as is described in WO 96/30421 and WO 98/01480. A preferred radically transferable atom or group ●Hal is ●Cl or ●Br, which is cleaved as a radical from the initiator molecule.

[In] represents the polymerization initiator fragment of a polymerization initiator of formula (XI),

(XI)

capable of initiating polymerization of monomers or oligomers which polymerization initiator is selected from the group consisting of $C_1$-$C_8$-alkyl halides, $C_6$-$C_{15}$-aralkylhalides, $C_2$-$C_8$α-haloalkyl esters, arene sulfonyl chlorides, haloalkanenitriles, α-haloacrylates and halolactones, and p and q represent one.

Specific initiators are selected from the group consisting of α,α'-dichloro- or α,α'-dibromoxylene, p-toluenesulfonyl-chloride (PTS), hexakis-(α-chloro- or α-bromomethyl)-benzene, 2-chloro- or 2-bromopropionic acid, 2-chloro- or 2-bromoisobutyric acid, 1-phenethyl chloride or bromide, methyl or ethyl 2-chloro- or 2-bromopropionate, ethyl-2-bromo- or ethyl-2-chloroisobutyrate, chloro- or bromoacetonitrile, 2-chloro- or 2-bromopropionitrile, α-bromo-benzacetonitrile and α-bromo-γ-butyrolactone (=2-bromo-dihydro-2(3H)-furanone).

The transition metal in the oxidizable transition metal complex catalyst salt used in the process of the invention is present as an oxidizable complex ion in the lower oxidation state of a redox system. Preferred examples of such redox systems are selected from the group consisting of Group V(B), VI(B), VII(B), VIII, IB and IIB elements, such as $Cu^+/Cu^{2+}$, $Cu^0/Cu^+$, $Fe^0/Fe^{2+}$, $Fe^{2+}/Fe^{3+}$, $Ru^{2+}/Ru^{3+}$, $Ru^{3+}/Ru^{4+}$, $Os^{2+}/Os^{3+}$, $V^{n+}/V^{(n+1)+}$, $Cr^{2+}/Cr^{3+}$, $Co^+/Co^{2+}$, $Co^{2+}/Co^{3+}$, $Ni^0/Ni^+$, $Ni^+/Ni^{2+}$, $Ni^{2+}/Ni^{3+}$, $Mn^0/Mn^{2+}$, $Mn^{2+}/Mn^{3+}$, $Mn^{3+}/Mn^{4+}$ or $Zn^+/Zn^{2+}$.

The ionic charges are counterbalanced by anionic ligands commonly known in complex chemistry of transition metals, such hydride ions ($H^-$) or anions derived from inorganic or organic acids, examples being halides, e.g. $F^-$, $Cl^-$, $Br^-$ or $I^-$, fluoro complexes of the type $BF_4^-$, $PF_6^-$, $SbF_6^-$ or $AsF_6^-$, anions of oxygen acids, alcoholates or acetylides or anions of cyclopentadiene.

Anions of oxygen acids are, for example, sulfate, phosphate, perchlorate, perbromate, periodate, antimonate, arsenate, nitrate, carbonate, the anion of a $C_1$-$C_8$carboxylic acid, such as formate, acetate, propionate, butyrate, benzoate, phenylacetate, mono-, di- or trichloro- or -fluoroacetate, sulfonates, for example methylsulfonate, ethylsulfonate, propylsulfonate, butylsulfonate, trifluoromethylsulfonate(triflate), unsubstituted or $C_1$-$C_4$alkyl-, $C_1$-$C_4$alkoxy- or halo-, especially fluoro-, chloro- or bromo-substituted phenylsulfonate or benzylsulfonate, for example tosylate, mesylate, brosylate, p-methoxy- or p-ethoxyphenylsulfonate, pentafluorophenylsulfonate or 2,4,6-triisopropylsulfonate, phosphonates, for example methylphosphonate, ethylphosphonate, propylphosphonate, butylphosphonate, phenylphosphonate, p-methylphenylphosphonate or benzylphosphonate, carboxylates derived from a $C_1$-$C_8$carboxylic acid, for example formate, acetate, propionate, butyrate, benzoate, phenylacetate, mono-, di- or trichloro- or -fluoroacetate, and also $C_1$-$C_{12}$-alcoholates, such as straight chain or branched $C_1$-$C_{12}$-alcoholates, e.g. methanolate or ethanolate. Anionic ligands and neutral may also be present up to the preferred coordination number of the complex cation, especially four, five or six. Additional negative charges are counterbalanced by cations, especially monovalent cations such as $Na^+$, $K^+$, $NH_4^+$ or $(C_1$-$C_4$ alkyl$)_4N^+$.

Suitable neutral ligands are inorganic or organic neutral ligands commonly known in complex chemistry of transition metals. They coordinate to the metal ion through a σ-, π-, μ-, η-type bonding or any combinations thereof up to the preferred coordination number of the complex cation. Suitable inorganic ligands are selected from the group consisting of aquo ($H_2O$), amino, nitrogen, carbon monoxide and nitrosyl. Suitable organic ligands are selected from the group consisting of phosphines, e.g. $(C_6H_5)_3P$, $(i-C_3H_7)_3P$, $(C_5H_9)_3P$ or $(C_6H_{11})_3P$, di-, tri-, tetra- and hydroxyamines, such as ethylenediamine, ethylenediaminotetraacetate (EDTA), N,N-Dimethyl-N',N'-bis(2-dimethylaminoethyl)-ethylenediamine (Me₆TREN), catechol, N,N'-dimethyl-1,2-benzenediamine, 2-(methylamino)phenol, 3-(methylamino)-2-butanol or N,N'-bis(1,1-dimethylethyl)-1,2-ethanediamine, N,N,N',N'',N''-pentamethyldiethyltriamine (PMD-ETA), $C_1$-$C_8$-glycols or glycerides, e.g. ethylene or propylene glycol or derivatives thereof, e.g. di-, tri- or tetra-glyme, and monodentate or bidentate heterocyclic e⁻ donor ligands.

Heterocyclic e⁻ donor ligands are derived, for example, from unsubstituted or substituted heteroarenes from the group consisting of furan, thiophene, pyrrole, pyridine, bis-pyridine, picolylimine, g-pyran, g-thiopyran, phenanthroline, pyrimidine, bis-pyrimidine, pyrazine, indole, coumarone, thionaphthene, carbazole, dibenzofuran, dibenzothiophene, pyrazole, imidazole, benzimidazole, oxazole, thiazole, bis-thiazole, isoxazole, isothiazole, quinoline, bis-quinoline, iso-quinoline, bis-isoquinoline, acridine, chromene, phenazine, phenoxazine, phenothiazine, triazine, thianthrene, purine, bis-imidazole and bis-oxazole.

The oxidizable transition metal complex catalyst can be formed in a separate preliminary reaction step from its ligands or is preferably formed in-situ from its transition metal salt, e.g. Cu(I)Cl, which is then converted to the complex compound by addition of compounds corresponding to the ligands present in the complex catalyst, e.g. by addition of ethylenediamine, EDTA, Me₆TREN or PMDETA.

Preferably the oxidizable transition metal in the transition metal complex salt is present as a transition metal complex ion in the lower oxidation state of a redox system.

More preferably the transition metal complex ion is a Cu(I) complex ion in the Cu(I)/Cu(II) system.

Suitable NMRP control agents having a glycidyl functionality are, for example, described in WO 99/46261 or WO 02/48109.

The glycidyl functionalized NMRP control agents are useful as initiators/regulators for controlled radical polymerization which in addition have a highly reactive functional group allowing polymer analogous reactions or a reaction during polycondensation of condensation polymers.

Preferred is a method wherein the porous substrate is a polymer selected from the group consisting of a polysulfone, polycarbonate, polypropylene, polyamide and polyether sulfone.

In a specific embodiment the method for the preparation of a functionalized thin film composite polyamide membrane on a microporous substrate comprises carrying out on the porous substrate a polycondensation reaction of a) an aromatic amine of formula (I)

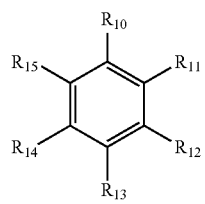

wherein at least two of $R_{10}$-$R_{15}$ are —NH₂ and the others are independently hydrogen or $C_1$-$C_4$alkyl; with an aromatic acyl halide of formula (II)

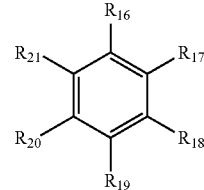

wherein at least 3 of $R_{16}$-$R_{21}$ are a group —C(O)Cl and the others are independently hydrogen or $C_1$-$C_4$alkyl; in the presence of b1) a RAFT control agent of formula (IIIa) or (IIIb)

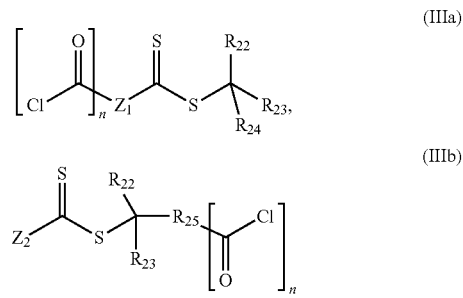

or b2) an ATRP control agent of formula (IVa) or (IVb)

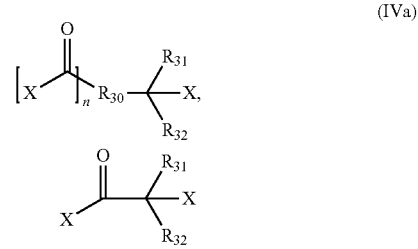

or b3) a NMRP control agent of formula (Va) of (Vb)

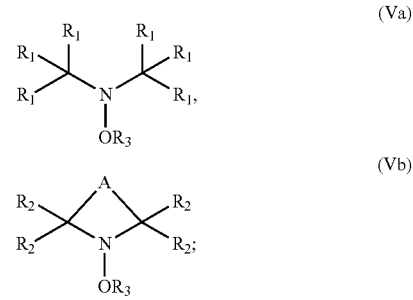

wherein n is a number from 1 to 4;
wherein in formula (IIIa) and (IIIb)
$Z_1$ in formula (IIIa) is $C_1$-$C_{18}$alkylene, $C_3$-$C_{18}$alkylene which is interrupted by one or more oxygen atoms or phenylene, which all may be substituted by $C_1$-$C_4$alkyl, halogen, cyano, $C_1$-$C_4$alkoxy or $C_1$-$C_4$alkoxycarbonyl;

$Z_2$ in formula (IIIb) is hydrogen, chlorine, $C_1$-$C_{18}$alkyl, phenyl, $C_3$-$C_7$cyloalkyl, $C_3$-$C_7$cycloalkenyl, $C_3$-$C_7$heterocycloalkyl, $C_3$-$C_7$heterocycloalkenyl, $C_1$-$C_{18}$alkylthio, phenylthio, $C_7$-$C_{12}$-phenylalkylthio, $C_1$-$C_{18}$alkoxy, phenyloxy, amino, $C_1$-$C_{18}$alkoxycarbonyl, phenyloxycarbonyl, carboxy, $C_1$-$C_{18}$acyloxy, benzoyloxy, carbamoyl, cyano, $C_2$-$C_{18}$-dialkyl-phosphonato, diphenyl-phosphonato, $C_1$-$C_{18}$dialkyl-phosphinato, diphenyl-phosphinato or a polymer chain having a number average degree of polymerization in the range of 5 to 1000; which groups may all be substituted by $C_1$-$C_4$alkyl, halogen, cyano, $C_1$-$C_4$alkoxy or $C_1$-$C_4$alkoxycarbonyl;

$R_{22}$, $R_{23}$ and $R_{24}$ are each independently H, halogen, $C_1$-$C_{20}$ alkyl, preferably $C_1$-$C_{10}$ alkyl and more preferably $C_1$-$C_6$ alkyl, $C_1$-$C_6$ cycloalkyl, a polymer chain having a number average degree of polymerization in the range 5 to 1000, $C(=Y)R_{101}$, $C(=Y)NR_{102}R_{103}$ where Y may be $NR_{104}$ or O, preferably O, $R_{101}$ is alkyl of from 1 to 20 carbon atoms, alkoxy of from 1 to 20 carbon atoms, aryloxy or heterocycloxy, $R_{102}$ and $R_{103}$ are independently H or alkyl of from 1 to 20 carbon atoms, or $R_{102}$ and $R_{103}$ are joined together to form an alkylene group of from 2 to 5 carbon atoms, thus forming a 3- to 6-membered ring, and $R_{104}$ is H, straight or branched $C_1$-$C_{20}$ alkyl or aryl; or $R_{22}$, $R_{23}$ and $R_{24}$ are each independently CN, $C_2$-$C_{20}$ alkenyl or alkynyl, preferably $C_2$-$C_4$ alkenyl or alkynyl, and more preferably vinyl, oxiranyl, glycidyl, aryl, heterocyclyl, aralkyl, aryl-substituted alkenyl, where alkyl is defined above, and alkenyl is vinyl which may be substituted with one or two $C_1$-$C_4$ alkyl groups and/or halogen atoms, preferably chlorine, $C_1$-$C_6$ alkyl in which from 1 to all of the hydrogen atoms, preferably one, are replaced with halogen, preferably fluorine, bromine or chlorine, where 1 or more hydrogen atoms are replaced, and preferably fluorine or bromine where 1 hydrogen atom is replaced and $C_1$-$C_6$ alkyl substituted with from 1 to 3 substituents, preferably 1 selected from the group consisting of $C_1$-$C_4$ alkoxy, aryl, heterocyclyl, $C(=Y)R_{101}$, $C(=Y)NR_{102}R_{103}$, oxiranyl and glycidyl; such that no more than two of $R_{22}$, $R_{23}$ and $R_{24}$ are H, preferably no more than one of $R_{22}$, $R_{23}$ and $R_{24}$ is H;

$R_{25}$ is $C_1$-$C_{18}$ alkylene, $C_3$-$C_{18}$ alkylene which is interrupted by one or more oxygen atoms, or phenylene, which all may be substituted by $C_1$-$C_4$ alkyl, halogen, cyano, $C_1$-$C_4$ alkoxy, $C(=Y)R_{101}$, $C(=Y)NR_{102}R_{103}$ where Y, $R_{101}$, $R_{102}$ and $R_{103}$ are as defined above;

wherein in formula (IVa) and (IVb)

X is Cl, Br or I;

$R_{30}$ is $C_1$-$C_{18}$ alkylene, $C_3$-$C_{18}$ alkylene which is interrupted by one or more oxygen atoms, or phenylene, which all may be substituted by $C_1$-$C_4$ alkyl, halogen, cyano, $C_1$-$C_4$ alkoxy, $C(=Y)R_{101}$, $C(=Y)NR_{102}R_{103}$ where Y, $R_{101}$, $R_{102}$ and $R_{103}$ are as defined above;

$R_{31}$ and $R_{32}$ have the same meaning as $R_{22}$ and $R_{23}$;

wherein in formula (Va) and (Vb)

the $R_1$, are each independently of one another hydrogen, halogen, $NO_2$, cyano, —$CONR_5R_6$, —$(R_9)COOR_4$, —C(O)—$R_7$, —$OR_8$, —$SR_8$, —$N(R_8)_2$, carbamoyl, di($C_1$-$C_{18}$alkyl)carbamoyl, —$C(=NR_5)(NHR_6)$;

unsubstituted $C_1$-$C_{18}$alkenyl, $C_2$-$C_{18}$alkynyl, $C_7$-$C_9$phenylalkyl, $C_3$-$C_{12}$cycloalkyl or $C_2$-$C_{12}$heterocycloalkyl; or $C_1$-$C_{18}$alkyl, $C_1$-$C_{18}$alkenyl, $C_2$-$C_{18}$ alkynyl, $C_7$-$C_9$-phenylalkyl, $C_3$-$C_{12}$cycloalkyl or $C_2$-$C_{12}$heterocycloalkyl, which are substituted by $NO_2$, halogen, amino, hydroxy, cyano, carboxy, $C_1$-$C_4$alkoxy, $C_1$-$C_4$alkylthio, $C_1$-$C_4$alkylamino or di($C_1$-$C_4$alkyl)amino; or phenyl, naphthyl, which are unsubstituted or substituted by $C_1$-$C_4$alkyl, $C_1$-$C_4$alkoxy, $C_1$-$C_4$alkylthio, halogen, cyano, hydroxy, carboxy, $C_1$-$C_4$alkylamino or di($C_1$-$C_4$alkyl)amino;

$R_4$ is hydrogen, $C_1$-$C_{18}$alkyl, phenyl, an alkali metal cation or a tetraalkylammonium cation;

$R_5$ and $R_6$ are hydrogen, $C_1$-$C_{18}$alkyl, $C_2$-$C_{18}$alkyl which is substituted by at least one hydroxy group or, taken together, form a $C_2$-$C_{12}$alkylene bridge or a $C_2$-$C_{12}$-alkylene bridge interrupted by at least one O or/and $NR_8$ atom;

$R_7$ is hydrogen, $C_1$-$C_{18}$alkyl or phenyl;

$R_8$ is hydrogen, $C_1$-$C_{18}$alkyl or $C_2$-$C_{18}$alkyl which is substituted by at least one hydroxy group;

$R_9$ is $C_1$-$C_{12}$alkylene or a direct bond;

or all $R_1$ form together the residue of a polycyclic cycloaliphatic ring system or a polycyclic heterocycloaliphatic ring system with at least one di- or trivalent nitrogen atom;

the $R_2$ are independently of each other phenyl or $C_1$-$C_6$alkyl or two together with the linking carbon atom form a $C_5$-$C_6$cycloalkyl group;

A is a divalent group required to form a cyclic 5-, 6- or 7-membered ring and $R_3$ is a radical of formula (II)

(II)

wherein $X_1$ is phenylene, naphthylene or biphenylene, which are unsubstituted or substituted by $NO_2$, halogen, amino, hydroxy, cyano, carboxy, $C_1$-$C_4$alkoxy, $C_1$-$C_4$alkylthio, $C_1$-$C_4$alkylamino or di($C_1$-$C_4$alkyl)amino;

the R' are independently of each other H or $CH_3$;

D is a group

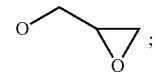

and m is a number from 1 to 4.

The alkyl radicals in the various substituents may be linear or branched. Examples of alkyl containing 1 to 18 carbon atoms are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl and octadecyl.

The alkenyl radicals in the various substituents may be linear or branched. Examples of $C_2$-$C_{18}$alkenyl are vinyl, allyl, 2-methylallyl, butenyl, hexenyl, undecenyl and octadecenyl. Preferred alkenyls are those, wherein the carbon atom in the 1-position is saturated and where the double bond is not activated by substituents like O, C=O, and the like.

Examples of $C_2$-$C_{18}$alkynyl are ethynyl, 2-butynyl, 3-hexynyl, 5-undecynyl, 6-octadecynyl. The alkynyl radicals may be linear or branched.

$C_7$-$C_9$phenylalkyl is for example benzyl, phenylpropyl, α,α-dimethylbenzyl or α-methylbenzyl. $C_7$-$C_{12}$alkylphenylthio has its preferences and examples in analogy.

$C_3$-$C_{12}$cycloalkyl which is unsubstituted or substituted by 1, 2 or 3 $C_1$-$C_4$alkyl is typically cyclopropyl, cyclopentyl, methylcyclopentyl, dimethylcyclopentyl, cyclohexyl, methylcyclohexyl.

Alkyl substituted by —OH is typically 2-hydroxyethyl, 2-hydroxypropyl or 2-hydroxybutyl.

$C_1$-$C_{18}$Alkyl substituted by $C_1$-$C_8$alkoxy, preferably by $C_1$-$C_4$alkoxy, in particular by methoxy or ethoxy, is typically 2-methoxyethyl, 2-ethoxyethyl, 3-methoxypropyl, 3-ethoxypropyl, 3-butoxypropyl, 3-octoxypropyl and 4-methoxybutyl.

$C_1$-$C_{18}$Alkyl substituted by di($C_1$-$C_4$alkyl)amino is preferably e.g. dimethylamino, diethylamino, 2-dimethylaminoethyl, 2-diethylaminoethyl, 3-dimethylaminopropyl, 3-diethylaminopropyl, 3-dibutylaminopropyl and 4-diethylaminobutyl.

$C_1$-$C_{18}$Alkyl substituted by $C_1$-$C_4$alkylamino is preferably e.g. methylamino, ethylamino, 2-methylaminoethyl, 2-ethylaminoethyl, 3-methylaminopropyl, 3-ethylaminopropyl, 3-butylaminopropyl and 4-ethylaminobutyl.

$C_1$-$C_8$Alkoxy and, preferably $C_1$-$C_4$alkoxy, are typically methoxy, ethoxy, propoxy, isopropoxy, butoxy, isobutoxy, pentoxy, isopentoxy, hexoxy, heptoxy or octoxy.

$C_1$-$C_4$Alkylthio is typically thiomethyl, thioethyl, thiopropyl, thioisopropyl, thiobutyl and thioisobutyl.

$C_3$-$C_{12}$heterocycloalkyl and preferably $C_3$-$C_7$heterocycloalkyl is typically oxirane, 1,4-dioxane, tetrahydrofuran, γ-butyrolactone, ε-caprolactam, oxirane, aziridine, diaziridine, pyrrole, pyrrolidine, thiophen, furan, pyrazole, imidazole, oxazole, oxazolidine, thiazole, pyran, thiopyran, piperidine or morpholine.

Examples of $C_1$-$C_{12}$alkylene bridges, preferably of $C_2$-$C_6$alkylene bridges, are ethylene, propylene, butylene, pentylene, hexylene.

$C_2$-$C_{12}$alkylene bridges interrupted by at least one N or O atom are, for example, —CH$_2$—O—CH$_2$—CH$_2$—, —CH$_2$—O—CH$_2$—CH$_2$—CH$_2$—, —CH$_2$—O—CH$_2$—CH$_2$—CH$_2$—CH$_2$—, —CH$_2$—O—CH$_2$—CH$_2$—O—CH2-, —CH$_2$—NH—CH$_2$—CH$_2$—, —CH$_2$—NH—CH$_2$—CH$_2$—CH$_2$—, —CH$_2$—NH—CH$_2$—CH$_2$—CH$_2$—CH$_2$—, —CH$_2$—NH—CH$_2$—CH$_2$—NH—CH2- or —CH$_2$—NH—CH$_2$—CH$_2$—O—CH2—.

Phenyl substituted by 1, 2 or 3 $C_1$-$C_4$alkyl or $C_1$-$C_4$alkoxy is typically methylphenyl, dimethylphenyl, trimethylphenyl, t-butylphenyl, di-t-butylphenyl, 3,5-di-t-butyl-4-methylphenyl, methoxyphenyl, ethoxyphenyl and butoxyphenyl.

Examples of polycyclic cycloaliphatic ring systems are adamantane, cubane, twistane, norbornane, bicyclo[2.2.2]octane or bicyclo[3.2.1]octane.

An example of a polycyclic heterocycloaliphatic ring system is hexamethylentetramine (urotropine).

Examples for a divalent group A required to form a cyclic 5-, 6- or 7-membered ring are: $C_2$-$C_4$alkylene, $C_2$-$C_4$alkenylene, $C_2$-$C_4$alkinylene, 1,2 phenylene which groups may be unsubstituted or substituted by NO$_2$, halogen, amino, hydroxy, cyano, carboxy, carbonyl, $C_1$-$C_{18}$alkoxy, $C_1$-$C_{18}$ acyloxy, benzoyloxy, $C_1$-$C_{18}$alkylthio, $C_1$-$C_{18}$alkylamino or di($C_1$-$C_{18}$alkyl)amino or phenyl.

When A has the meaning of $C_2$-$C_4$alkylene or $C_2$-$C_4$alkenylene, these groups may also be interrupted by an O or N atom.

$C_2$-$C_4$alkylene bridges interrupted by at least one N or O atom are, for example, —CH$_2$—O—CH$_2$—CH$_2$—, —CH$_2$—O—CH$_2$—, —O—CH$_2$—CH$_2$—, —O—CH$_2$—O—CH2-, —CH$_2$—NH—CH$_2$—, —CH$_2$—NH—CH$_2$—CH$_2$—, —NH—CH$_2$—CH$_2$—, —NH—CH$_2$—NH—CH2-, —O—CH$_2$— or —CH$_2$—O—C(O)—.

Examples of a monocarboxylic acid having up to 18 carbon atoms are formic acid, acetic acid, propionic acid, the isomers of valeric acid, methyl ethyl acetic acid, trimethyl acetic acid, caproic acid, lauric acid or stearic acid. Examples for unsaturated aliphatic acids are acrylic acid, methacrylic acid, crotonic acid, linolic acid and oleic acid.

Typical examples of cycloaliphatic carboxylic acids are cyclohexane carboxylic acid or cyclopentane carboxylic acid.

Examples of aromatic carboxylic acids are benzoic acid, salicylic acid or cinnamic acid.

The C-atom to which the substituents $R_1$ are bound is preferably a secondary or tertiary C-atom more preferably it is a tertiary C-atom.

In a further specific embodiment in the aromatic amine of formula (I) two of $R_{10}$-$R_{15}$ are —NH$_2$ in para or ortho position and the others are independently hydrogen or $C_1$-$C_4$alkyl;

in the aromatic acyl halide of formula (II)

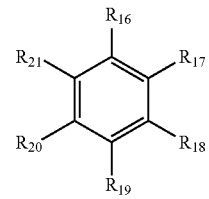

3 of $R_{16}$-$R_{21}$ are a group —C(O)Cl and the others are independently hydrogen or $C_1$-$C_4$alkyl;

n is a number from 1 to 3;

wherein in formula (IIIa) and (IIIb)

$Z_1$ in formula (IIIa) is $C_1$-$C_{18}$alkylene or phenylene;

$R_{22}$ in formula (IIIa) is a homolytic leaving group selected from the group consisting of $C_1$-$C_{18}$alkyl, $C_2$-$C_{18}$alkenyl, $C_2$-$C_{18}$alkynyl;

$Z_2$ in formula (IIIb) is hydrogen, chlorine, $C_1$-$C_{18}$alkyl, phenyl, $C_1$-$C_{18}$alkylthio, phenylthio, $C_7$-$C_{12}$phenylalkylthio;

$R_{23}$ in formula (IIIb) is $C_1$-$C_{18}$alkylene or phenylene;

wherein in formula (IVa) and (IVb)

X is Cl, Br or I;

$R_{30}$ is $C_1$-$C_{18}$alkylene or phenylene;

$R_{31}$ and $R_{32}$ are independently hydrogen, $C_1$-$C_{18}$alkyl, $C_3$-$C_8$cycloalkyl, $C_3$-$C_8$cycloalkenyl or phenyl;

wherein the NMRP control agent of formula (Vb) is of formula (Vc)

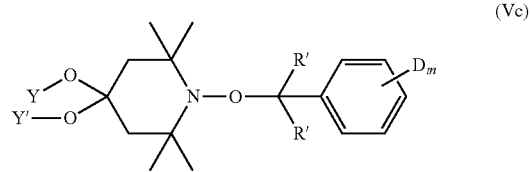

(Vc)

wherein
D is a group

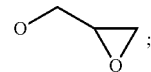

R' is H or CH$_3$;

m is 1, 2 or 3;

Y and Y' are independently $C_1$-$C_{12}$alkyl, $C_3$-$C_{12}$alkenyl, $C_3$-$C_{12}$alkinyl, $C_5$-$C_8$cycloalkyl, phenyl, naphthyl, $C_7$-$C_9$phenylalkyl; or Y and Y' together form one of the bivalent groups —C(R'$_1$)(R'$_2$)—CH(R'$_3$)—, CH(R'$_1$)—CH$_2$—C(R'$_2$)(R'$_3$)—, —CH —(R'₂)—CH₂—C(R'₁)(R'₃)—, —CH₂—C(R'₁)(R'₂)—CH(R'₃)—, o-phenylene, 1,2-cyclohexyliden,
—CH₂—CH=CH—CH₂— or

wherein
R'₁ is hydrogen, $C_1$-$C_{12}$alkyl, COOH, COO—($C_1$-$C_{12}$)alkyl or CH₂OR'₄;
R'₂ and R'₃ are independently hydrogen, methyl ethyl, COOH or COO—($C_1$-$C_{12}$)alkyl;
R'₄ is hydrogen, $C_1$-$C_{12}$alkyl, benzyl, or a monovalent acyl residue derived from an aliphatic, cycloaliphatic or aromatic monocarboxylic acid having up to 18 carbon atoms.

Preferably Y and Y' together form one of the bivalent groups —C(R'₁)(R'₂)—CH(R'₃)—, CH(R'₁)—CH₂—C(R'₂)(R'₃)—, —CH(R'₂)—CH₂—C(R'₁)(R'₃)—, —CH₂—C(R'₁)(R'₂)—CH(R'₃)—, o-phenylene, 1,2-cyclohexyliden, —CH₂—CH=CH—CH₂— or

wherein
R'₁ is hydrogen, $C_1$-$C_{12}$alkyl, COOH, COO—($C_1$-$C_{12}$)alkyl or CH₂OR'₄;
R'₂ and R'₃ are independently hydrogen, methyl ethyl, COOH or COO—($C_1$-$C_{12}$)alkyl;
R'₄ is hydrogen, $C_1$-$C_{12}$alkyl, benzyl, or a monovalent acyl residue derived from an aliphatic, cycloaliphatic or aromatic monocarboxylic acid having up to 18 carbon atoms.

Suitable individual NMRP control agents are listed below. The compounds are known and can be prepared as described in WO 02/48109 or WO 99/46261.

Particularly preferred are the following compounds:

4,4-Dibutoxy-2,6-diethyl-2,3,6-trimethyl-1-[1-(4-oxiranyl-methoxy-phenyl)-ethoxy]-piperidine

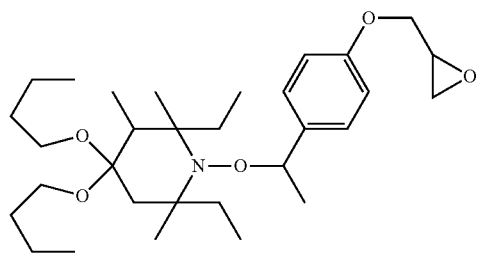 [SMILES: CCCCOC1(OCCCC)CC(C)(CC)N(OC(C)c2ccc(OCC3CO3)cc2)C(C)(CC)C1C]

7,9-Diethyl-6,7,9-trimethyl-8-[1-(4-oxiranylmethoxy-phenyl)-ethoxy]-1,4-dioxa-8-aza-spiro[4.5]decane

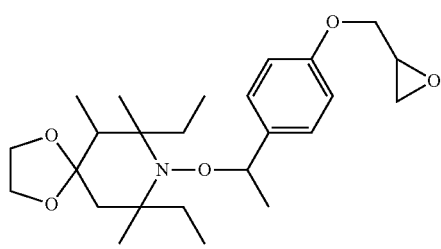 [SMILES: CCC1(C)CC2(OCCO2)C(C)C(C)(CC)N1OC(C)c1ccc(OCC2CO2)cc1]

8,10-Diethyl-3,3,7,8,10-pentamethyl-9-[1-(4-oxiranyl-methoxy-phenyl)-ethoxy]-1,5-dioxa-9-aza-spiro[5.5]undecane

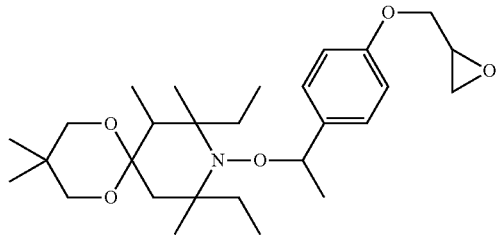 [SMILES: CCC1(C)CC2(OCC(C)(C)CO2)C(C)C(C)(CC)N1OC(C)c1ccc(OCC2CO2)cc1]

{8,10-Diethyl-3,7,8,10-tetramethyl-9-[1-(4-oxiranyl-methoxy-phenyl)-ethoxy]-1,5-dioxa-9-aza-spiro[5.5]undec-3-yl}-methanol

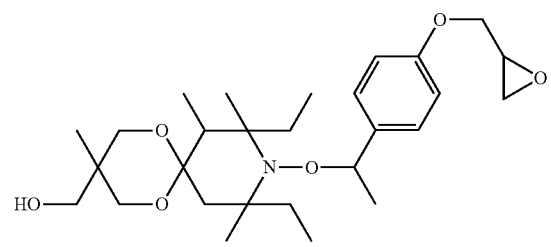 [SMILES: CCC1(C)CC2(OCC(C)(CO)CO2)C(C)C(C)(CC)N1OC(C)c1ccc(OCC2CO2)cc1]

{3,8,10-Triethyl-7,8,10-trimethyl-9-[1-(4-oxiranylmethoxy-phenyl)-ethoxy]-1,5-dioxa-9-aza-spiro[5.5]undec-3-yl}-methanol

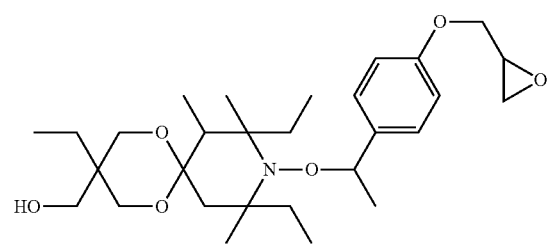 [SMILES: CCC1(CO)COC2(CC(C)(CC)N(OC(C)c3ccc(OCC4CO4)cc3)C(C)(CC)C2C)OC1]

4,4-Dibutoxy-2,2-diethyl-6,6-dimethyl-1-[1-(4-oxiranyl-methoxy-phenyl)-ethoxy]-piperidine

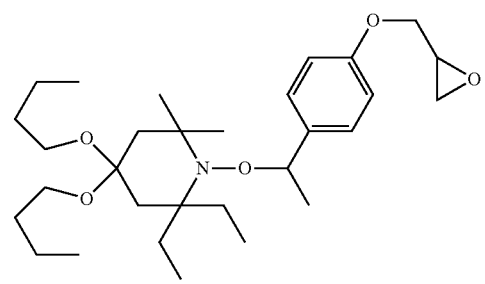 [SMILES: CCCCOC1(OCCCC)CC(C)(C)N(OC(C)c2ccc(OCC3CO3)cc2)C(CC)(CC)C1]

7,7-Diethyl-9,9-dimethyl-8-[1-(4-oxiranylmethoxy-phenyl)-ethoxy]-1,4-dioxa-8-aza-spiro[4.5]decane

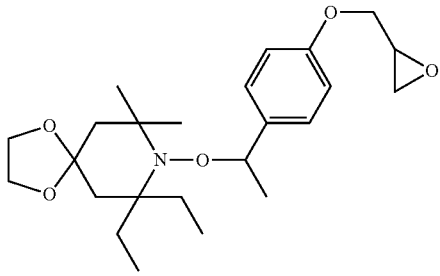 [SMILES: CCC1(CC)CC2(CC(C)(C)N1OC(C)c1ccc(OCC3CO3)cc1)OCCO2]

8,8-Diethyl-3,3,10,10-tetramethyl-9-[1-(4-oxiranylmethoxy-phenyl)-ethoxy]-1,5-dioxa-9-aza-spiro[5.5]undecane

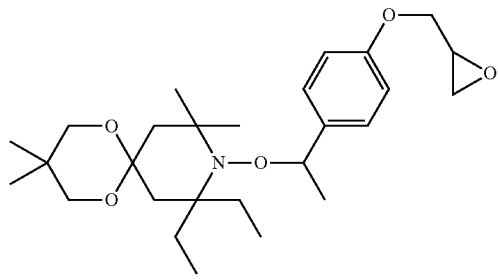 [SMILES: CCC1(CC)CC2(CC(C)(C)N1OC(C)c1ccc(OCC3CO3)cc1)OCC(C)(C)CO2]

{8,8-Diethyl-3,10,10-trimethyl-9-[1-(4-oxiranylmethoxy-phenyl)-ethoxy]-1,5-dioxa-9-aza-spiro[5.5]undec-3-yl}-methanol

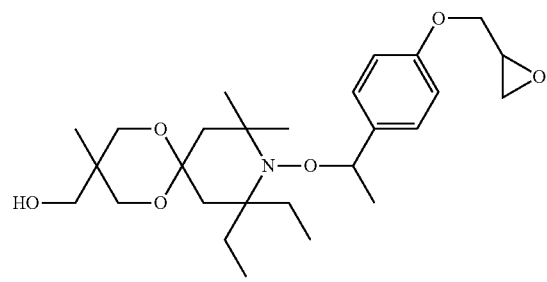 [SMILES: CCC1(CC)CC2(CC(C)(C)N1OC(C)c1ccc(OCC3CO3)cc1)OCC(C)(CO)CO2]

{3,8,8-Triethyl-10,10-dimethyl-9-[1-(4-oxiranylmethoxy-phenyl)-ethoxy]-1,5-dioxa-9-aza-spiro[5.5]undec-3-yl}-methanol

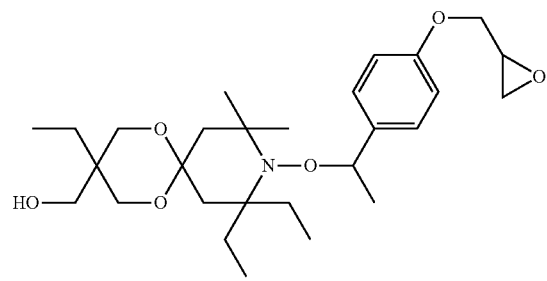 [SMILES: CCC1(CO)COC2(CC(C)(C)N(OC(C)c3ccc(OCC4CO4)cc3)C(CC)(CC)C2)OC1]

4,4-Dibutoxy-2,2,6,6-tetramethyl-1-[1-(4-oxiranylmethoxy-phenyl)-ethoxy]-piperidine

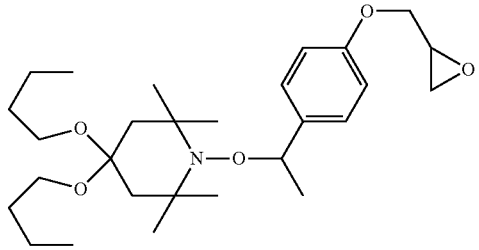 [SMILES: CCCCOC1(OCCCC)CC(C)(C)N(OC(C)c2ccc(OCC3CO3)cc2)C(C)(C)C1]

7,7,9,9-Tetramethyl-8-[1-(4-oxiranylmethoxy-phenyl)-ethoxy]-1,4-dioxa-8-aza-spiro[4.5]decane

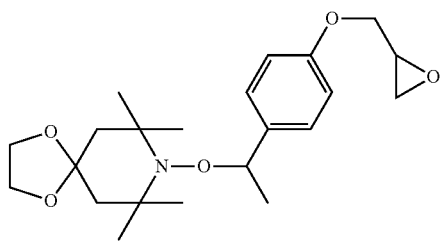 [SMILES: CC(ON1C(C)(C)CC2(CC1(C)C)OCCO2)c1ccc(OCC2CO2)cc1]

3,3,8,8,10,10-Hexamethyl-9-[1-(4-oxiranylmethoxy-phenyl)-ethoxy]-1,5-dioxa-9-aza-spiro[5.5]undecane

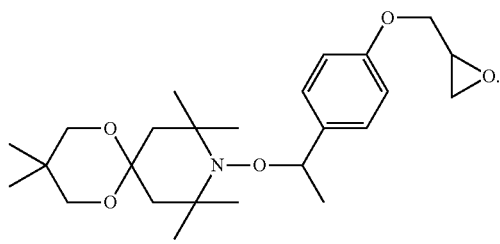

Most preferred is 3,3,8,8,10,10-Hexamethyl-9-[1-(4-oxiranylmethoxy-phenyl)-ethoxy]-1,5-dioxa-9-aza-spiro[5.5]undecane

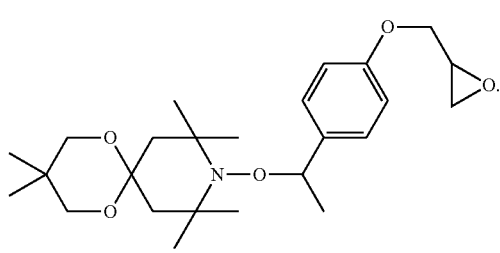 [SMILES: CC(ON1C(C)(C)CC2(CC1(C)C)OCC(C)(C)CO2)c1ccc(OCC2CO2)cc1]

The polycondensation may be carried out in any convenient solvent, which does not interact with the reagents. A convenient way to carry out the polycondensation reaction and to prepare the RAFT/ATRP/NMRP functionalized polyamide membrane is by:

a) the preparation of an aqueous solution containing the aromatic polyamine;

b) the preparation of an organic solution containing a mixture of the aromatic polyacyl halide and the RAFT CTA acid chloride or ATRP initiator acid halide or epoxy-functional NMRP initiator dissolved in a "non polar solvent";

c) soaking the microporous substrate in the aqueous solution containing the aromatic polyamine;

d) pouring the aromatic solution (aromatic polyacyl halide+RAFT CTA acid chloride, ATRP initiator acid halide or epoxy functional NMRP initiator) on the soaked microporous surface.

e) allowing the reaction at the interface between the solutions, at room temperature for 10 seconds.

The amount of the RAFT control agent, the ATRP control agent or the NMRP control agent having a glycidyl functionality, is typically 0.01% to 5% by weight based on the weight of the aromatic amine and the aromatic acyl halide.

Typically the weight ratio between the aromatic acyl halide with at least 3 —C(O)Cl groups; and the RAFT control agent, the ATRP control agent or the NMRP control agent having a glycidyl functionality is from 50:1 to 1:5.

The polycondesation reaction is, for example, carried out at a temperature from 5° C. to 40° C., preferably at a temperature between 15° C. and 25° C. at normal pressure. The reaction time can vary in a wide range, typically between 1 second and 60 minutes, preferably between 1 second and 60 seconds.

The obtained film should be dried with a hot air flow or under ambient conditions and washed three times with distilled water to eliminate some secondary products formed by competing reactions (aminolysis) and to remove excess reagents.

The "nonpolar solvent" may be aliphatic liquids such as pentane, hexanes, heptanes, octanes; cycloalkanes such as cyclohexane.

Preparation methods and use of thin film composite membranes are principally known and, for example described by R. J. Petersen in Journal of Membrane Science 83 (1993) 81-150.

Another aspect of the invention is a method for the modification of a functionalized thin film composite polyamide membrane on a microporous substrate according to claim 1 or 2, comprising polymerizing an ethylenically unsaturated monomer in the presence of a source of free radicals and the functionalized thin film composite polyamide membrane, resulting in the formation of polymer chains that are covalently bound to the thin film composite membrane.

Preferences and definitions for the aromatic amine with at least two amine functionalities, the aromatic acyl halide with at least 3 —C(O)Cl groups, the RAFT control agent, the ATRP control agent and the NMRP control agent having a glycidyl functionality have been described above and apply equally for the other aspects of the invention.

The source of initiating radicals can be any suitable method for generating free radicals such as the thermally induced homolytic scission of a suitable compound as thermal initiators such as peroxides and azo compounds; the spontaneous generation from monomer (e.g. styrene), photochemical initiating systems or high energy radiation such as electron beam, X—, UV or gamma radiation. The initiator should have the requisite solubility in the reaction media or monomer mixture.

Typically the source of free radicals is UV-light together with a photoinitiator, γ-radiation, electron beam radiation, a redox pair or heat together with a thermal initiator.

The source of free radicals, i.e. the thermal radical initiator is preferably an azo compound, a peroxide, perester or a hydroperoxide.

Specific preferred radical sources are 2,2'-azobisisobutyronitrile, 2,2'-azobis(2-methyl-butyronitrile), 2,2'-azobis(2,4-dimethylvaleronitrile), 2,2'-azobis(4-methoxy-2,4-dimethylvale-ronitrile), 1,1'-azobis(1-cyclohexanecarbonitrile), 2,2'-azobis(isobutyramide)dihydrate, 2-phenylazo-2,4-dimethyl-4-methoxyvaleronitrile, dimethyl-2,2'-azobisisobutyrate, 2-(carbamoylazo)isobutyronitrile, 2,2'-azobis(2,4,4-trimethylpentane), 2,2'-azobis(2-methylpropane), 2,2'-azobis(N,N'-dimethyleneisobutyramidine), free base or hydrochloride, 2,2'-azobis(2-amidinopropane), free base or hydrochloride, 2,2'-azobis{2-methyl-N-[1,1-bis(hydroxymethyl)ethyl]propionamide} or 2,2'-azobis{2-methyl-N-[1,1-bis(hydroxymethyl)-2-hydroxyethyl]propionamide}; acetyl cyclohexane sulphonyl peroxide, diisopropyl peroxy dicarbonate, t-amyl perneodecanoate, t-butyl perneodecanoate, t-butyl perpivalate, t-amylperpivalate, bis(2,4-dichlorobenzoyl)peroxide, diisononanoyl peroxide, didecanoyl peroxide, dioctanoyl peroxide, dilauroyl peroxide, bis(2-methylbenzoyl)peroxide, disuccinic acid peroxide, diacetyl peroxide, dibenzoyl peroxide, t-butyl per 2-ethylhexanoate, bis-(4-chlorobenzoyl)-peroxide, t-butyl perisobutyrate, t-butyl permaleinate, 1,1-bis(t-butylperoxy)3,5,5-trimethylcyclohexane, 1,1-bis(t-butylperoxy)cyclohexane, t-butyl peroxy isopropyl carbonate, t-butyl perisononaoate, 2,5-dimethylhexane 2,5-dibenzoate, t-butyl peracetate, t-amyl perbenzoate, t-butyl perbenzoate, 2,2-bis(t-butylperoxy)butane, 2,2 bis(t-butylperoxy)propane, dicumyl peroxide, 2,5-dimethylhexane-2,5-di-t-butylperoxide, 3-t-butylperoxy 3-phenylphthalide, di-t-amyl peroxide, α,α'-bis(t-butylperoxy isopropyl)benzene, 3,5-bis(t-butylperoxy)3,5-dimethyl 1,2-dioxolane, di-t-butyl peroxide, 2,5-dimethylhexyne-2,5-di-t-butylperoxide, 3,3,6,6,9,9-hexamethyl 1,2,4,5-tetraoxa cyclononane, p-menthane hydroperoxide, pinane hydroperoxide, diisopropylbenzene mono-α-hydroperoxide, cumene hydroperoxide or t-butyl hydroperoxide.

The radical source is preferably present in an amount of from 0.01 mol-% to 30 mol-%, more preferred in an amount of from 0.1 mol-% to 20 mol-% and most preferred in an amount of from 0.5 mol-% to 10 mol-% based on the monomer or monomer mixture.

It is also possible to use monomer mixtures. When monomer mixtures are used the molar amount is calculated on the average molecular weight of the monomers.

The temperature at which the radical polymerization is typically carried out depends on the origin of the reactive sites of the membrane and the source of free radicals. When RAFT or ATRP reactive sites are the staring points for polymerization, a typical reaction temperature between 5° C. and 40° C. is applied, in particular when X-ray, γ-ray or UV radiation is used. When the NMRP reactive sites are the starting points for radical polymerization the temperature may vary between 50° C. and 150° C., in particular when thermal initiators are used.

The reaction time is for example from 10 minutes to 24 hours at ambient pressure.

The monomers suitable for use in the present invention may be water-soluble or water-insoluble. Water soluble monomers contain typically a salt of a carboxylic acid group. Water insoluble monomers are typically free of acid and phenolic groups.

Typical metal atoms are Na, K or Li.

Typical monoethylenically unsaturated monomers free of carboxylic acid and phenolic groups which are suitable for this invention include the alkyl esters of acrylic or methacrylic acids such as methyl acrylate, ethyl acrylate, butyl acrylate, methyl methacrylate, ethyl methacrylate, butyl methacrylate and isobutyl methacrylate; the hydroxyalkyl esters of acrylic or methacrylic acids, such as hydroxyethyl acrylate, hydroxypropyl acrylate, hydroxyethyl methacrylate, and hydroxypropyl methacrylate; acrylamide, methacrylamide, N-tertiary butylacrylamide, N-methylacrylamide, N,N-dimethylacrylamide; acrylonitrile, methacrylonitrile, allyl alcohol, dimethylaminoethyl acrylate, dimethylaminoethyl methacrylate, phosphoethyl methacrylate, N-vinylpyrrolidone, N-vinylformamide, N-vinylimidazole, vinyl acetate, conjugated dienes such as butadiene or isoprene, styrene, styrenesulfonic acid salts, vinylsulfonic acid salts and 2-acrylamido-2-methylpropane-sulfonic acid salts and acryloil chloride.

Preferred ethylenically unsaturated monomers or oligomers are selected from the group consisting of styrene, substituted styrene, conjugated dienes, acrolein, vinyl acetate, (alkyl)acrylic acidanhydrides, (alkyl)acrylic acid salts, (alkyl)acrylic esters or (alkyl)acrylamides.

Particularly preferred ethylenically unsaturated monomers are styrene, α-methyl styrene, p-methyl styrene, butadiene, methylacrylate, ethylacrylate, propylacrylate, n-butyl acrylate, tert.-butyl acrylate and acrylnitril.

Preferred acrylates are methylacrylate, ethylacrylate, butylacrylate, isobutylacrylate, tert. butylacrylate, hydroxyethylacrylate, hydroxypropylacrylate, di methylaminoethylacrylate, glycidylacrylates, methyl(meth)acrylate, ethyl(meth)acrylate, butyl(meth)acrylate, hydroxyethyl(meth)acrylate, hydroxypropyl(meth)acrylate, dimethylaminoethyl(meth)acrylate, glycidyl(meth)acrylates, acrylonitrile, acrylamide or methacrylamide.

Examples for $C_8$-$C_{16}$ ethylenically unsaturated phenolics, which may also be used as comonomers include 4-hydroxy styrene, 4-hydroxy-α-methyl styrene, and 2,6-ditert. butyl, 4-vinyl phenol.

Another class of carboxylic acid monomers suitable for use as comonomers in this invention are the alkali metal and ammonium salts of $C_4$-$C_6$-ethylenically unsaturated dicarboxylic acids. Suitable examples include maleic acid, maleic anhydride, itaconic acid, mesaconic acid, fumaric acid and citraconic acid. Maleic anhydride (and itaconic acid are) is the preferred monoethylenically unsaturated dicarboxylic acid monomer(s).

The acid monomers suitable for use in this invention are in the form of the alkali metal salts or ammonium salts of the acid.

The polymerizable composition of the present invention may additionally comprise a solvent selected from the group consisting of water, alcohols, esters, ethers, ketones, amides, sulfoxides, hydrocarbons and halogenated hydrocarbons.

For instance the weight ratio of functionalized thin film composite polyamide membrane to ethylenically unsaturated monomer is from 10:1 to 1:10.

Since the radical polymerization is a living polymerization different monomers can be used subsequently to form a growing block copolymer.

Random copolymers and tapered copolymer structures can be synthesized as well by using a mixture of monomers or adding a second monomer before the first one is completely consumed.

The process may be carried out in the presence of an organic solvent or in the presence of water or in mixtures of organic solvents and water. Additional cosolvents or surfactants, such as glycols or ammonium salts of fatty acids, may be present. Other suitable cosolvents are described hereinafter.

Preferred processes use water as a solvent.

If organic solvents are used, suitable solvents or mixtures of solvents are typically pure alkanes (hexane, heptane, octane, isooctane), hydrocarbons (benzene, toluene, xylene), halogenated hydrocarbons (chlorobenzene), alkanols (methanol, ethanol, ethylene glycol, ethylene glycol monomethyl ether), esters (ethyl acetate, propyl, butyl or hexyl acetate) and ethers (diethyl ether, dibutyl ether, ethylene glycol dimethyl ether), or mixtures thereof.

The aqueous polymerization reactions can be supplemented with a water-miscible or hydrophilic cosolvent to help ensure that the reaction mixture remains a homogeneous single phase throughout the monomer conversion. Any water-soluble or water-miscible cosolvent may be used, as long as the aqueous solvent medium is effective in providing a solvent system which prevents precipitation or phase separation of the reactants or polymer products until after all polymerization reactions have been completed. Exemplary cosolvents useful in the present invention may be selected from the group consisting of aliphatic alcohols, glycols, ethers, glycol ethers, pyrrolidines, N-alkyl pyrrolidinones, N-alkyl pyrrolidones, polyethylene glycols, polypropylene glycols, amides, carboxylic acids and salts thereof, esters, organosulfides, sulfoxides, sulfones, alcohol derivatives, hydroxyether derivatives such as butyl carbitol or cellosolve, amino alcohols, ketones, and the like, as well as derivatives thereof and mixtures thereof. Specific examples include methanol, ethanol, propanol, dioxane, ethylene glycol, propylene glycol, diethylene glycol, glycerol, dipropylene glycol, tetrahydrofuran, and other water-soluble or water-miscible materials, and mixtures thereof. When mixtures of water and water-soluble or water-miscible organic liquids are selected as the aqueous reaction media, the water to cosolvent weight ratio is typically in the range of about 100:0 to about 10:90.

The monomers, polymers, copolymers and modified functionalized TFC polyamide membranes of the present invention can be separated from one another or from the polymerization reaction mixture by washing the membrane with the suitable solvent.

After the polymerizing step is complete, the modified functionalized TFC polyamide membrane obtained is isolated. The isolating step of the present process is conducted by known procedures, e.g. by washing the membrane with a suitable solvent and drying it under vacuum.

The (co)polymers of the present invention may have a number average molecular weight from 1000 to 400000 g/mol, preferably from 2000 to 250000 g/mol, and more preferably from 2000 to 200000 g/mol. When produced in bulk, the number average molecular weight may be up to 500000 g/mol (with the same minimum weights as mentioned above). The number average molecular weight may be determined by analyzing the non-grafted polymer formed during the reaction. The characterization may be by size exclusion chromatography (GPC), matrix assisted laser desorption/ionization mass spectroscopy (MALDI-MS) or, if the initiator carries a group which can be easily distinguished from the monomer(s), by NMR spectroscopy or other conventional methods.

Further aspects of the invention are a functionalized thin film composite polyamide membrane and a modified functionalized thin film composite polyamide membrane, prepared according to the methods described above.

The modified functionalized TFC polyamide membranes prepared by the present invention may be employed in water purification processes, separation processes such as the desalination of water or brackish water; other treatments of water such as softening of hard water whereby salts are removed.

The following examples illustrate the invention.

Materials and Methods

Microporous polysulfone membranes are used as received. Reagent grade chemicals are used as received. The RAFT CTA acid chloride of formula (XIII) is prepared according to the bibliography.

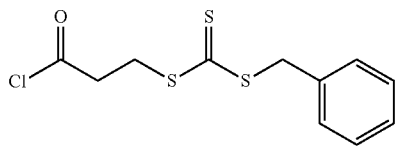
(XIII)

Diethyl 5-hydroxymethylisophthalate is prepared according to the method of Leon et al. (J. W. Leon et al., J. Am. Chem. Soc. 1996, 118, 8847-8859). This is used to prepare the ATRP acid chloride initiator of formula (XII) as outlined in Example 1.

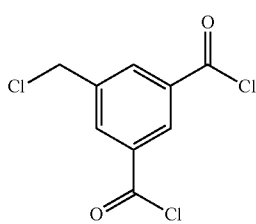
(X)

The RAFT CTA acid chloride of formula (XIV) is prepared as outlined in Example 2.

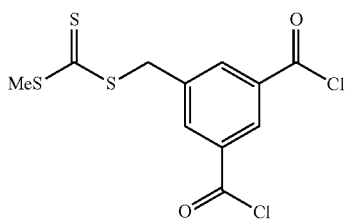
(XIV)

CGX PR 774 (XIIa)

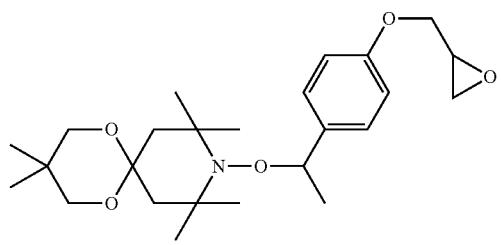 [SMILES: CC(ON1C(C)(C)CC2(CC1(C)C)OCC(C)(C)CO2)c1ccc(OCC2CO2)cc1]

is obtained from Ciba and used as received. It has been prepared according to WO 02/48109.

Interfacial polymerization reactions are performed at room temperature. Trimesoyl chloride, m-phenylene diamine, ethyl 2-bromoisobutyrate, methyl-2-bromopropionate, 2-bromoisobutyryl bromide and cyclohexane are used as received. Water and acrylic acid are distilled before use. N-isopropyl acrylamide as passed through a column of alkaline aluminium oxide prior to use. N,N,N',N',N'',N''-Hexamethyl tris(aminoethyl)amine is prepared according to the method of Ciampolini et al. (Inorg. Chem. 1966, 5, 41-44). Bis(α,α-dimethyl acetic acid)trithiocarbonate is synthesized according to the method of J. T. Lai et al. (Macromolecules, 2002, 35, 6754-6756). Gamma radiation initiated RAFT polymerization re-actions are carried out in an insulated room with a $^{60}$Co source with a dose rate of 30 Gy.h$^{-1}$ at ambient temperature.

Attenuated Total Reflected Fourier Spectroscopy (ATR-FTIR) measurements are performed using Bruker FRA 106S Fourier transform spectrometer. X-Ray Photoelectron Spectroscopy (XPS) is performed in a ESCALAB 220i-XL CG Scientific UK instrument or an AXIS HSi spectrometer (Kratos Analytical Ltd) at $5 \times 10^{-10}$ mbar, using a monochromated X-ray Al k alpha source (energy 1486.6 eV, power 200 W). Pass energy: 100 eV for wide scans or 20 eV for region scans and spectral step size: 1 eV for wide scans or 0.1 eV for region scans. The NMR spectra are recorded on a Bruker AC200 (200 MHz for $^1$H NMR) spectrometer. Chemical shifts are quoted relative to (external) tetramethylsilane (TMS).

EXAMPLE 1

Synthesis of ATRP acid chloride initiator X

Preparation of 5-Hydroxymethylisophthalic Acid

Diethyl 5-hydroxyisophthalate (1 g) is added to a solution of 0.5 g NaOH in 10 g H$_2$O and heated to 70° C. for 2 h. Acidification results in formation of a white precipitate (0.736 g, 94.6%). NMR ($^1$H, 200 MHz, acetone-d$_6$): δ 4.8 (2H, s, CH$_2$OH), 8.25 (2H, s, H ortho to CH$_2$OH), 8.55 (1H, s, H para to CH$_2$OH) ppm.

Preparation of 5-Chloromethyl Isophthaloyl Chloride (X).

5-hydroxymethyl-isophthalic acid (7.78 g) is suspended in thionyl chloride (50 mL). A few drops of DMF are added and the mixture is heated to reflux for 2 h. Thionyl chloride is removed under reduced pressure. X is obtained as a yellow liquid (8.63 g, 86.5%). NMR ($^1$H, 200 MHz, CDCl$_3$): δ 4.7 (2H, s, CH$_2$Cl), 8.4 (2H, s, H ortho to CH$_2$Cl), 8.75 (1H, s, H para to CH$_2$Cl) ppm. $^{13}$C, 200 MHz, CDCl$_3$: δ 43.9, 133.3, 134.8, 136.6, 140.2, 166.8 ppm.

EXAMPLE 2

Synthesis of RAFT Acid Chloride CTA XIV

Preparation of 5-Chloromethyl Isophthalic Acid.

X (5 g) is dissolved in 50 ml 90:10 acetone:H$_2$O and stirred 48 h. The solution is precipitated into 500 mL ice-water, filtered and the solid product is dissolved in EtOAc, and dried over MgSO$_4$. 4.43 g 5-chloromethyl isophthalic acid is recovered after removal of the solvent under reduced pressure. NMR ($^1$H, 200 MHz, CDCl$_3$): δ 4.9 (2H, s, CH$_2$Cl), 8.3 (2H, d, J=1.6 Hz, H ortho to CH$_2$Cl), 8.6 (1H, t, J=1.6 Hz, H para to CH$_2$Cl) ppm. $^{13}$C, 200 MHz, CDCl$_3$: δ 44.7, 130.3, 131.6, 133.8, 139.3, 165.6 ppm.

Preparation of 5-Methylsulfanylthiocarbonyl-sulfanylmethyl Isophthalic Acid.

Carbon disulfide (0.7 mL, 11.6 mmol) is added to a suspension of sodium methanethiolate (0.7 g, 10 mmol) in 10 mL acetone. 10 mL H$_2$O is added to the resulting yellow solution. A solution of 5-chloromethyl isophthalic acid (0.5 g) in 20 mL 5 wt % aq. NaOH is added dropwise. The resulting mixture is stirred for 3 h, then acidified with conc. HCl. A yellow precipitate is formed. This is dissolved in EtOAc, dried over MgSO$_4$ and the solvent is removed under reduced pressure, yielding 2.34 g of yellow solid 5-methylsulfanylthiocarbonylsulfanylmethyl isophthalic acid. NMR ($^1$H, 200

MHz, acetone-$d_6$): δ 2.8 (3H, s, $CH_2SCS_2CH_3$) 4.9 (2H, s, $CH_2SCS_2CH_3$), 8.3 (2H, d, J=1.6 Hz, H ortho to $CH_2SCS_2CH_3$), 8.55 (1H, t, J=1.6 Hz, H para to $CH_2SCS_2CH_3$) ppm. $^{13}$C, 200 MHz, acetone-$d_6$: δ 17.9, 39.5, 129.7, 131.6, 134.2, 137.6, 165.9, 233.2 ppm.

Preparation of XIV.

5-methylsulfanylthiocarbonylsulfanylmethyl isophthalic acid (0.5 g, 1.7 mmol) is suspended in 5 mL $CH_2Cl_2$. Oxalyl chloride (0.5 mL, 6 mmol) is added. A drop of DMF is added and the mixture is heated to reflux for 1 h. The solvent is removed under reduced pressure. The residue is extracted with hexane, and the hexane-soluble fraction (XII) is isolated. NMR ($^1$H, 200 MHz, CDCl$_3$): δ 2.8 (3H, s, $CH_2SCS_2CH_3$) 4.7 (2H, s, $CH_2SCS_2CH_3$), 8.4 (2H, s, H ortho to $CH_2SCS_2CH_3$), 8.7 (1H, s, H para to $CH_2SCS_2CH_3$) ppm. $^{13}$C, 200 MHz, CDCl$_3$: δ 20.5, 39.2, 132.8, 134.6, 137.4, 139.3, 167.0, 222.4 ppm.

EXAMPLE 3

Synthesis of RAFT-Functionalized TFC Polyamide Membrane by Interfacial Polymerization of m-Phenylenediamine (MPD), Trimesoyl Chloride (TMC) and RAFT CTA Acid Chloride (XIII) on Microporous Polysulfone Membrane An aqueous solution containing 3% w/v of MPD and an organic solution containing a mixture of TMC (0.1% w/v) and of RAFT CTA acid chloride (XV) (0.1% w/v) in cyclohexane are prepared. The polysulfone microporous substrate is then fixed on a glass flat support and soaked with the aqueous solution containing the MPD. After 2 minutes the excess solution is drained off the surface. The organic solution (TMC+XV in cyclohexane) is then poured onto the soaked polysulfone surface and allowed to react during 10 seconds. The film is dried with a hot air flow, ished 3 times with distilled water and dried under vacuum at 60° C. for 12 h. XPS analysis: C, 74%; O, 21%; N, 0.46%; S, 3.46%. Contact angle: 89°.

EXAMPLE 4

Synthesis of RAFT-Functionalized TFC Polyamide Membrane by Interfacial Polymerization of m-Phenylenediamine (MPD), Trimesoyl Chloride (TMC) and RAFT CTA Acid Chloride (XIV) on Microporous Polysulfone Membrane An aqueous solution containing 2% w/v of MPD and an organic solution containing a mixture of TMC (0.075% w/v) and of RAFT CTA acid chloride (XVI) (0.025% w/v) in cyclohexane are prepared. The polysulfone microporous substrate is soaked with the aqueous solution containing the MPD. After 2 minutes the excess solution is drained off the surface. The organic solution (TMC+XVI in cyclohexane) is then poured onto the soaked polysulfone surface and allowed to react during 10 seconds. The film is dried with a hot air flow, washed 3 times with distilled water and dried under vacuum at 60° C. for 12 h. XPS analysis: C, 69.8%; O, 22.3%; N, 7.2%; S, 0.7%. Contact angle: 29.3°.

EXAMPLE 5

Polymerization of N-Isopropyl Acrylamide on RAFT Functionalized TFC Polyamide Membranes Using γ-Radiation N-isopropylacrylamide (35 mmol) and XIII (0.03 mmol) are dissolved in 24 ml of water and stirred at room temperature during 20 minutes. The RAFT functionalized TFC polyamide membrane (Example 3) is placed in a glass sample vial containing 3 ml of the aqueous solution previously prepared. The vial is capped with a rubber septum and deoxygenated by purging with nitrogen gas for 15 min. The sample is placed in an insulated room with a $^{60}$Co source with a dose rate of 30 Gy.h$^{-1}$ at ambient temperature. After 4 h of reaction, the membrane is washed with distilled water during 3 days and dried under vacuum. XPS analysis: C, 69.21%; O, 17.45%; N, 2.90%; S, 1.62%. Contact angle: 55° (after 5 seconds).

EXAMPLE 6

Polymerization of Acrylic Acid on RAFT Functionalized TFC Polyamide Membranes Using UV-Radiation Acrylic acid (300 mmol), XIII (0.15 mmol) and UV-initiator (2-methyl-4'-(methylthio)-2-morpholinopropriophenone) (0.015 mmol) are dissolved in 24 mL of water and stirred at room temperature during 20 minutes. The RAFT functionalized TFC polyamide membrane (Example 3) is placed in a glass sample vial containing 3 ml of the aqueous solution previously prepared. The vial is capped with a rubber septum and deoxygenated by purging with nitrogen gas for 15 minutes. The sample is placed in an insulated room with a UV source at ambient temperature. After 4 h of reaction, the membrane is washed with distilled water during 3 days and dried under vacuum. XPS analysis: C, 71.58%; O, 18.55%; N, 0.79%; S, 1.84%. Contact angle: 60.54° (after 16 minutes).

EXAMPLE 7

Polymerization of N-Isopropyl Acrylamide on RAFT Functionalized TFC Polyamide Membranes Using Thermal Initiation N-isopropylacrylamide (5.5 g), bis(α,α-dimethylacetic acid)trithiocarbonate (57 mg) and VA-044 (270 mg) are dissolved in 100 ml of phosphate buffer (pH 7) and stirred at room temperature during 20 minutes. The RAFT functionalized TFC polyamide membrane (Example 4) is placed in a glass sample vial containing 10 ml of the aqueous solution previously prepared. The vial is deoxygenated by purging with nitrogen gas for 15 min. The sample is placed in a nitrogen-filled vacuum oven at ambient temperature. After 16 h of reaction, the membrane is washed with distilled water during 3 days and dried under vacuum. XPS analysis: C, 73.6%; O, 14.5%; N, 10.8%; S, 1.1%.

EXAMPLE 8

Synthesis of ATRP-Functionalized TFC Polyamide Membrane by Interfacial Polymerization of m-Phenylenediamine (MPD), Trimesoyl Chloride (TMC) and 2-Bromoisobutyryl Bromide on Microporous Polysulfone Membrane An aqueous solution containing 2% w/v of MPD and an organic solution containing a mixture of TMC (0.05% w/v) and of 2-bromoisobutyryl bromide (0.05% w/v) in cyclohexane are prepared. The polysulfone microporous substrate is soaked with the aqueous solution containing the MPD. After 2 minutes the excess solution is drained off the surface. The organic solution (TMC+bromoisobutyryl bromide) is then poured onto the soaked polysulfone surface and allowed to react during 10 seconds. The film is dried, washed 3 times with distilled water and dried under vacuum at 60° C. for 12 h. XPS analysis: C, 71.3%; O, 18.5%; N, 9.1%; Br, 0.8%. Contact angle: 43°.

EXAMPLE 9

Synthesis of ATRP-Functionalized TFC Polyamide Membrane by Interfacial Polymerization of m-Phenylenediamine (MPD), Trimesoyl Chloride (TMC) and 5-Chloromethyl Isophthaloyl Chloride (X) on Microporous Polysulfone Membrane An aqueous solution containing 2% w/v of MPD and an organic solution containing a mixture of TMC (0.09% w/v) and of X (0.01% w/v) in cyclohexane are prepared. The polysulfone microporous substrate is soaked with the aqueous solution containing the MPD. After 2 minutes the excess solution is drained off the surface. The organic solution (TMC+X) is then poured onto the soaked polysulfone surface and allowed to react during 10 seconds. The film is dried, washed 3 times with distilled water and dried under vacuum at 60° C. for 12 h. XPS analysis: C, 69.6%; O, 23.1%; N, 6.8%; Cl, 0.6%. Contact angle: 37°.

EXAMPLE 10

Synthesis of NMRP-Functionalized TFC Polyamide Membrane by Interfacial Polymerization of m-Phenylenediamine (MPD), Trimesoyl Chloride (TMC) and CGX-PR774 (XIIa) on Microporous Polysulfone Membrane An aqueous solution containing 2% w/v of MPD and an organic solution containing a mixture of TMC (0.05% w/v) and of XII (0.05% w/v) in cyclohexane are prepared. The polysulfone microporous substrate is soaked with the aqueous solution containing the MPD. After 2 minutes the excess solution is drained off the surface. The organic solution (TMC+XII) is then poured onto the soaked polysulfone surface and allowed to react during 10 seconds. The film is dried in an oven at 80° C. for 30 min, washed 3 times with distilled water and dried under vacuum at 60° C. for 12 h. XPS analysis: C, 70.0%; O, 21.9%; N, 6.6%.

EXAMPLE 11

Polymerization of N-isopropyl acrylamide on ATRP Functionalized TFC Polyamide membranes in presence of sacrificial initiator N-isopropylacrylamide (5 g), N,N,N',N',N'',N''-hexamethyl tris(aminoethyl)amine (Me$_6$tren, 407 mg) is dissolved in 100 ml of distilled water degassed by sparging with N$_2$ during 20 minutes. CuCl (43.7 mg) and CuCl$_2$ (119 mg) is added and degassing is continued for 40 minutes. The ATRP functionalized TFC polyamide membrane (Example 8) is placed in a glass sample vial containing 15 ml of the aqueous solution previously prepared. Methyl 2-bromopropionate (8 µL) is added to the vial, which is purged by sparging with N$_2$ gas for 1 minute, then sealed. After 3 h of reaction at ambient temperature, the membrane is washed with distilled water during 3 days and dried under vacuum. XPS analysis: C, 77.3%; O, 11.3%; N, 11.3%. Conversion (NMR of bulk solution) 90.0%.

EXAMPLE 12

Polymerization of N-Isopropyl Acrylamide on ATRP Functionalized TFC Polyamide Membranes in Presence of Sacrificial Initiator N-isopropylacrylamide (5 g), N,N,N',N',N'',N''-hexamethyl tris(aminoethyl)amine (Me$_6$tren, 407 mg) is dissolved in 100 ml of distilled water degassed by sparging with N$_2$ during 20 minutes. CuCl (43.7 mg) and CuCl$_2$ (119 mg) is added and degassing is continued for 40 minutes. The ATRP functionalized TFC polyamide membrane (Example 9) is placed in a glass sample vial containing 15 ml of the aqueous solution previously prepared. Methyl 2-bromopropionate (10 µL) is added to the vial, which is purged by sparging with N$_2$ gas for 1 minute, then sealed. After 30 min of reaction at ambient temperature, the membrane is washed with distilled water during 3 days and dried under vacuum. XPS analysis: C, 74.2%; O, 13.5%; N, 12.3%. Conversion (NMR of bulk solution): 97.2%.

EXAMPLE 13

Polymerization of N-Isopropyl Acrylamide on ATRP Functionalized TFC Polyamide Membranes without Sacrificial Initiator N-isopropylacrylamide (5 g), N,N,N',N',N'',N''-hexamethyl tris(aminoethyl)amine (Me$_6$tren, 407 mg) is dissolved in 100 ml of distilled water degassed by sparging with N$_2$ during 20 minutes. CuCl (43.7 mg) and CuCl$_2$ (119 mg) is added and degassing is continued for 40 minutes. The ATRP functionalized TFC polyamide membrane (Example 8) is placed in a glass sample vial containing 15 ml of the aqueous solution previously prepared. The vial is purged by sparging with N$_2$ gas for 1 minute, then sealed. After 24 h of reaction at ambient temperature, the membrane is washed with distilled water during 3 days and dried under vacuum. XPS analysis: C, 75.3%; O, 12.7%; N, 12.0%. NMR analysis showed negligible polymerization had occurred in the solution.

The invention claimed is:
1. A method for the preparation of a functionalized thin film composite polyamide membrane, which method comprises carrying out on a microporous substrate a
  polycondensation reaction of
  a) an aromatic amine with at least two amine functionalities; with
  an aromatic acyl halide with at least 3 —C(O)Cl groups; in the presence of
  b1) a radical addition fragmentation chain transfer (RAFT) control agent or
  b2) an atom transfer radical polymerization (ATRP) control agent or
  b3) a nitroxide-mediated radical polymerization (NMRP) control agent having a glycidyl functionality.
2. A method according to claim 1 for the preparation of a functionalized thin film composite membrane consisting of a continuous polyamide layer on a microporous substrate, comprising carrying out on a microporous substrate a polycondensation reaction of a) an aromatic amine with at least two amine functionalities; with
an aromatic acyl halide with at least 3 —C(O)Cl groups; and
b1) a radical addition fragmentation chain transfer (RAFT) control agent having an acid halide functionality,
b2) an atom transfer radical polymerization (ATRP) control agent having an acid halide functionality, or
b3) a nitroxide-mediated radical polymerization (NMRP) control agent having a glycidyl functionality.

3. A method according to claim 2, further comprising polymerizing an ethylenically unsaturated monomer in the presence of a source of free radicals and the functionalized thin film composite polyamide membrane, resulting in the formation of polymer chains that are covalently bound to the thin film composite membrane.

4. A method according to claim 1 for the preparation of a functionalized thin film composite polyamide membrane comprising carrying out on the microporous substrate a polycondensation reaction of
a) an aromatic amine of formula (I)

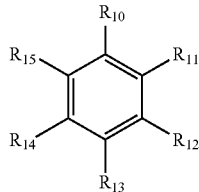

wherein at least two of $R_{10}$-$R_{15}$ are —$NH_2$ and the others are independently hydrogen or $C_1$-$C_4$alkyl; with
an aromatic acyl halide of formula (II)

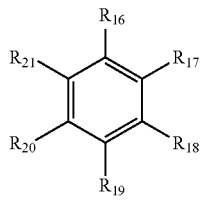

wherein at least 3 of $R_{16}$-$R_{21}$ are a group —C(O)Cl and the others are independently hydrogen or $C_1$-$C_4$alkyl; in the presence of
b1) a RAFT control agent of formula (IIIa) or (IIIb)

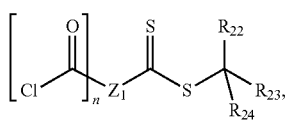
(IIIa)

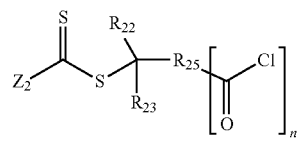
(IIIb)

or
b2) an ATRP control agent of formula (IVa) or (IVb)

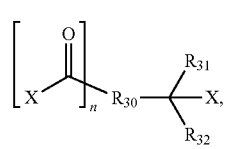
(IVa)

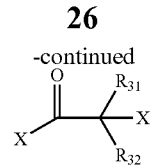

or
b3) a NMRP control agent of formula (Va) or (Vb)

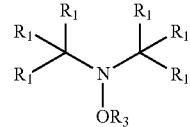
(Va)

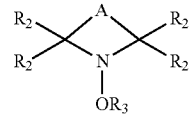
(Vb)

wherein n is a number from 1 to 4;
wherein in formula (IIIa) and (IIIb)
$Z_1$ in formula (IIIa) is $C_1$-$C_{18}$alkylene, $C_3$-$C_{18}$alkylene which is interrupted by one or more oxygen atoms or phenylene, which all may be substituted by $C_1$-$C_4$alkyl, halogen, cyano, $C_1$-$C_4$alkoxy or $C_1$-$C_4$alkoxycarbonyl;
$Z_2$ in formula (IIIb) is hydrogen, chlorine, $C_1$-$C_{18}$alkyl, phenyl, $C_3$-$C_7$cyloalkyl, $C_3$-$C_7$cycloalkenyl, $C_3$-$C_7$heterocycloalkyl, $C_3$-$C_7$heterocycloalkenyl, $C_1$-$C_{18}$alkylthio, phenylthio, $C_7$-$C_{12}$-phenylalkylthio, $C_1$-$C_{18}$alkoxy, phenyloxy, amino, $C_1$-$C_{18}$alkoxycarbonyl, phenyloxycarbonyl, carboxy, $C_1$-$C_{18}$acyloxy, benzoylloxy, carbamoyl, cyano, $C_2$-$C_{18}$-dialkyl-phosphonato, diphenyl-phosphonato, $C_1$-$C_{18}$dialkyl-phosphinato, diphenyl-phosphinato or a polymer chain having a number average degree of polymerization in the range of 5 to 1000; which groups may all be substituted by $C_1$-$C_4$alkyl, halogen, cyano, $C_1$-$C_4$alkoxy or $C_1$-$C_4$alkoxycarbonyl;
$R_{22}$, $R_{23}$ and $R_{24}$ are each independently H, halogen, $C_1$-$C_{20}$ alkyl, $C_1$-$C_8$ cycloalkyl, a polymer chain having a number average degree of polymerization in the range 5 to 1000, C(=Y)$R_{101}$ or C(=Y)$NR_{102}R_{103}$, where Y is $NR_{104}$ or O, $R_{101}$ is alkyl of from 1 to 20 carbon atoms, alkoxy of from 1 to 20 carbon atoms, aryloxy or heterocycloxy, $R_{102}$ and $R_{103}$ are independently H or alkyl of from 1 to 20 carbon atoms or $R_{102}$ and $R_{103}$ are joined together to form an alkylene group of from 2 to 5 carbon atoms, thus forming a 3- to 6-membered ring, and $R_{104}$ is H, straight or branched $C_1$-$C_{20}$ alkyl or aryl;
or $R_{22}$, $R_{23}$ and $R_{24}$ are each independently CN, $C_2$-$C_{20}$ alkenyl or alkynyl, oxiranyl, glycidyl, aryl, heterocyclyl, aralkyl or aryl-substituted alkenyl where alkyl is defined above and alkenyl is vinyl which may be substituted with one or two $C_1$-$C_4$ alkyl groups and/or halogen atoms; $C_1$-$C_6$ alkyl in which from 1 to all of the hydrogen atoms are replaced with halogen or $C_1$-$C_8$ alkyl substituted with from 1 to 3 substituents selected from the group consisting of $C_1$-$C_4$ alkoxy, aryl, heterocyclyl, C(=Y)$R_{101}$, C(=Y)$NR_{102}R_{103}$, oxiranyl and glycidyl; such that no more than two of $R_{22}$, $R_{23}$ and $R_{24}$ are H, and
$R_{25}$ is $C_1$-$C_{18}$ alkylene, $C_3$-$C_{18}$ alkylene which is interrupted by one or more oxygen atoms, or phenylene, which all may be substituted by $C_1$-$C_4$ alkyl, halogen, cyano, $C_1$-$C_4$ alkoxy, $C(=Y)R_{101}$ or $C(=Y)NR_{102}R_{103}$ where Y, $R_{101}$, $R_{102}$ and $R_{103}$ are as defined above;

wherein in formula (IVa) and (IVb)

X is Cl, Br or I;

$R_{30}$ is $C_1$-$C_{18}$ alkylene, $C_3$-$C_{18}$ alkylene which is interrupted by one or more oxygen atoms, or phenylene, which all may be substituted by $C_1$-$C_4$ alkyl, halogen, cyano, $C_1$-$C_4$ alkoxy, $C(=Y)R_{101}$, or $C(=Y)NR_{102}R_{103}$ where Y, $R_{101}$, $R_{102}$ and $R_{103}$ are as defined above; and $R_{31}$ and $R_{32}$ have the same meaning as $R_{22}$ and $R_{23}$;

wherein in formula (Va) and (Vb)

the $R_1$ are each independently of one another hydrogen, halogen, $NO_2$, cyano, —$CONR_5R_6$, —$(R_9)COOR_4$, —$C(O)$—$R_7$, —$OR_8$, —$SR_8$, —$NHR_8$, —$N(R_8)_2$, carbamoyl, di($C_1$-$C_{18}$alkyl)carbamoyl, —$C(=NR_5)(NHR_6)$;

unsubstituted $C_1$-$C_{18}$alkyl, $C_2$-$C_{18}$alkenyl, $C_2$-$C_{18}$alkynyl, $C_7$-$C_9$-phenylalkyl, $C_3$-$C_{12}$cycloalkyl or $C_2$-$C_{12}$heterocycloalkyl; or $C_1$-$C_{18}$alkyl, $C_2$-$C_{18}$alkenyl, $C_2$-$C_{18}$ alkynyl, $C_7$-$C_9$-phenylalkyl, $C_3$-$C_{12}$cycloalkyl or $C_2$-$C_{12}$heterocycloalkyl, which are substituted by $NO_2$, halogen, amino, hydroxy, cyano, carboxy, $C_1$-$C_4$alkoxy, $C_1$-$C_4$alkylthio, $C_1$-$C_4$alkylamino or di($C_1$-$C_4$alkyl)amino; or phenyl or naphthyl, which are unsubstituted or substituted by $C_1$-$C_4$alkyl, $C_1$-$C_4$alkoxy, $C_1$-$C_4$alkylthio, halogen, cyano, hydroxy, carboxy, $C_1$-$C_4$alkylamino or di($C_1$-$C_4$alkyl)amino;

$R_4$ is hydrogen, $C_1$-$C_{18}$alkyl, phenyl, an alkali metal cation or a tetraalkylammonium cation;

$R_5$ and $R_6$ are hydrogen, $C_1$-$C_{18}$alkyl, $C_2$-$C_{18}$alkyl which is substituted by at least one hydroxy group or, taken together, form a $C_2$-$C_{12}$alkylene bridge or a $C_2$-$C_{12}$-alkylene bridge interrupted by at least one O or/and $NR_8$ atom;

$R_7$ is hydrogen, $C_1$-$C_{18}$alkyl or phenyl;

$R_8$ is hydrogen, $C_1$-$C_{18}$alkyl or $C_2$-$C_{18}$alkyl which is substituted by at least one hydroxy group;

$R_9$ is $C_1$-$C_{12}$alkylene or a direct bond;

or all $R_1$ form together the residue of a polycyclic cycloaliphatic ring system or a polycyclic heterocycloaliphatic ring system with at least one di- or trivalent nitrogen atom;

the $R_2$ are independently of each other phenyl or $C_1$-$C_6$alkyl or two together with the linking carbon atom form a $C_5$-$C_6$cycloalkyl group;

A is a divalent group required to form a cyclic 5-, 6- or 7-membered ring and $R_3$ is a radical of formula (II)

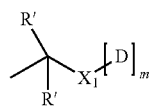

(II)

wherein $X_1$ is phenylene, naphthylene or biphenylene, which are unsubstituted or substituted by $NO_2$, halogen, amino, hydroxy, cyano, carboxy, $C_1$-$C_4$alkoxy, $C_1$-$C_4$alkylthio, $C_1$-$C_4$alkylamino or di($C_1$-$C_4$alkyl)amino;

the R' are independently of each other H or $CH_3$;

D is a group

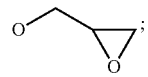

and m is a number from 1 to 4.

5. A method according to 4 where the polycondensation reaction is carried out in the presence of b1) a RAFT control agent of formula (IIIa) or (IIIb).

6. A method according to claim 4 where the polycondensation reaction is carried out in the presence of b2) an ATRP control agent of formula (IVa) or (IVb).

7. A method according to claim 4 where the polycondensation reaction is carried out in the presence of b3) a NMRP control agent of formula (Va) or (Vb).

8. A method according to claim 4 wherein the microporous substrate is a polymer selected from the group consisting of a polysulfone, polycarbonate, polypropylene, polyamide and polyether sulfone.

9. A method according to claim 4, further comprising polymerizing an ethylenically unsaturated monomer in the presence of a source of free radicals and the functionalized thin film composite polyamide membrane, resulting in the formation of polymer chains that are covalently bound to the thin film composite membrane.

10. A method according to claim 1 wherein the microporous substrate is a polymer selected from the group consisting of a polysulfone, polycarbonate, polypropylene, polyamide and polyether sulfone.

11. A method according to claim 4 wherein in the aromatic amine of formula (I) two of $R_{10}$-$R_{15}$ are —$NH_2$ in para or ortho position and the others are independently hydrogen or $C_1$-$C_4$alkyl;

in the aromatic acyl halide of formula (II)

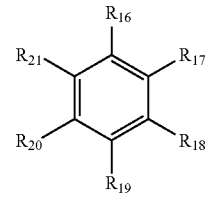

3 of $R_{16}$-$R_{21}$ are a group —$C(O)Cl$ and the others are independently hydrogen or $C_1$-$C_4$alkyl;

wherein n is a number from 1 to 3;

wherein in formula (IIIa) and (IIIb)

$Z_1$ in formula (IIIa) is $C_1$-$C_{18}$alkylene or phenylene;

$R_{22}$ in formula (IIIa) is a homolytic leaving group selected from the group consisting of $C_1$-$C_{18}$alkyl, $C_2$-$C_{18}$alkenyl and $C_2$-$C_{18}$alkynyl;

$Z_2$ in formula (IIIb) is hydrogen, chlorine, $C_1$-$C_{18}$alkyl, phenyl, $C_1$-$C_{18}$alkylthio, phenylthio or $C_7$-$C_{12}$phenylalkylthio; and $R_{23}$ in formula (IIIb) is $C_1$-$C_{18}$alkylene or phenylene;

wherein in formula (IVa) and (IVb)

X is Cl, Br or I;

$R_{30}$ is $C_1$-$C_{18}$alkylene or phenylene; and $R_{31}$ and $R_{32}$ are independently hydrogen, $C_1$-$C_{18}$alkyl, $C_3$-$C_8$cycloalkyl, $C_3$-$C_8$cycloalkenyl or phenyl;

and wherein the NMRP control agent is of formula (Vc)

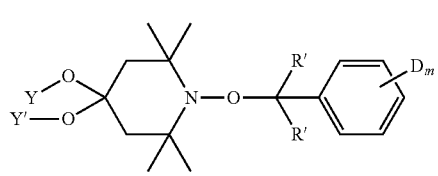

(Vc)

wherein

D is a group

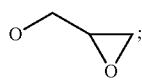

R' is H or CH$_3$;

m is 1, 2 or 3;

Y and Y' are independently C$_1$-C$_{12}$alkyl, C$_3$-C$_{12}$alkenyl, C$_3$-C$_{12}$alkinyl, C$_5$-C$_8$cycloalkyl, phenyl, naphthyl or C$_7$-C$_9$-phenylalkyl; or Y and Y' together form one of the bivalent groups —C(R'$_1$)(R'$_2$)—CH(R'$_3$)—, CH(R'$_1$)—CH$_2$—C(R'$_2$)(R'$_3$)—, —CH(R'$_2$)—CH$_2$—C(R'$_1$)(R'$_3$)—, —CH$_2$—C(R'$_1$)(R'$_2$)—CH(R'$_3$)—, o-phenylene, 1,2-cyclohexyliden, —CH$_2$—CH═CH—CH$_2$— or

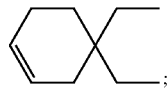

wherein

R'$_1$ is hydrogen, C$_1$-C$_{12}$alkyl, COOH, COO—(C$_1$-C$_{12}$)alkyl or CH$_2$OR'$_4$;

R'$_2$ and R'$_3$ are independently hydrogen, methyl ethyl, COOH or COO—(C$_1$-C$_{12}$)alkyl; and R'$_4$ is hydrogen, C$_1$-C$_{12}$alkyl, benzyl or a monovalent acyl residue derived from an aliphatic, cycloaliphatic or aromatic monocarboxylic acid having up to 18 carbon atoms.

12. A method according to claim 11 comprising carrying out the polycondensation reaction in the presence of the NMRP control agent of formula (Vc) wherein Y and Y' together form one of the bivalent groups —C(R'$_1$)(R'$_2$)—CH(R'$_3$)—, CH(R'$_1$)—CH$_2$—C(R'$_2$)(R'$_3$)—, —CH(R'$_2$)—CH$_2$—C(R'$_1$)(R'$_3$)—, —CH$_2$—C(R'$_1$)(R'$_2$)—CH(R'$_3$)—, o-phenylene, 1,2-cyclohexyliden, —CH$_2$—CH═CH—CH$_2$— or

wherein

R'$_1$ is hydrogen, C$_1$-C$_{12}$alkyl, COOH, COO—(C$_1$-C$_{12}$)alkyl or CH$_2$OR'$_4$;

R'$_2$ and R'$_3$ are independently hydrogen, methyl ethyl, COOH or COO—(C$_1$-C$_{12}$)alkyl; and R'$_4$ is hydrogen, C$_1$-C$_{12}$alkyl, benzyl or a monovalent acyl residue derived from an aliphatic, cycloaliphatic or aromatic monocarboxylic acid having up to 18 carbon atoms.

13. A method according to claim 1 wherein the weight ratio between the aromatic acyl halide with at least 3 —C(O)Cl groups; and
  b1) a RAFT control agent or
  b2) an ATRP control agent or
  b3) a NMRP control agent having a glycidyl functionality is from 50:1 to 1:5.

14. A method according to claim 1, further comprising polymerizing an ethylenically unsaturated monomer in the presence of a source of free radicals and the functionalized thin film composite polyamide membrane, resulting in the formation of polymer chains that are covalently bound to the thin film composite membrane.

15. A method according to claim 14 wherein the ethylenically unsaturated monomer is selected from the group consisting of styrene, substituted styrene, conjugated dienes, acrolein, vinyl acetate, (alkyl)acrylic acidanhydrides, (alkyl)acrylic acid salts, (alkyl)acrylic esters and (alkyl)acrylamides.

16. A method according to claim 14 wherein the source of free radicals is UV-light together with a photoinitiator, γ-radiation, electron beam radiation, a redox pair or heat together with a thermal initiator.

17. A method according to claim 14 wherein the weight ratio of functionalized thin film composite polyamide membrane to ethylenically unsaturated monomer is from 10:1 to 1:10.

* * * * *